(12) United States Patent
Srivastava

(10) Patent No.: US 12,355,581 B1
(45) Date of Patent: Jul. 8, 2025

(54) BREAKOUT CHAT CHANNELS

(71) Applicant: Zoom Video Communications, Inc., San Jose, CA (US)

(72) Inventor: Sachin Srivastava, San Ramon, CA (US)

(73) Assignee: Zoom Communications Inc., San Jose, CA (US)

( * ) Notice: Subject to any disclaimer, the term of this patent is extended or adjusted under 35 U.S.C. 154(b) by 21 days.

(21) Appl. No.: 18/389,993

(22) Filed: Dec. 20, 2023

(51) Int. Cl.
  *H04L 12/18* (2006.01)
  *G06F 16/34* (2019.01)
  *H04N 7/15* (2006.01)

(52) U.S. Cl.
  CPC ........ *H04L 12/1822* (2013.01); *G06F 16/345* (2019.01); *H04N 7/15* (2013.01)

(58) Field of Classification Search
  None
  See application file for complete search history.

(56) References Cited

U.S. PATENT DOCUMENTS

| | | | | |
|---|---|---|---|---|
| 2019/0238489 | A1* | 8/2019 | Cohen | H04L 51/216 |
| 2021/0110327 | A1* | 4/2021 | Bellet | G06Q 10/10 |
| 2022/0116341 | A1* | 4/2022 | Smullen | H04L 67/61 |
| 2022/0294800 | A1* | 9/2022 | Madaan | H04L 12/1822 |
| 2023/0030976 | A1* | 2/2023 | Kalinichenko | H04L 65/403 |
| 2023/0247028 | A1* | 8/2023 | Madaan | H04L 51/216 726/4 |
| 2024/0087052 | A1* | 3/2024 | Olson | G06Q 50/01 |
| 2024/0121124 | A1* | 4/2024 | Abraham | H04L 12/1818 |
| 2024/0176960 | A1* | 5/2024 | Maurer | G06F 16/345 |
| 2024/0179193 | A1* | 5/2024 | Maurer | G06N 3/08 |
| 2024/0406221 | A1* | 12/2024 | Gupta | H04L 65/1095 |
| 2024/0427546 | A1* | 12/2024 | Shruti | G06F 3/1454 |

FOREIGN PATENT DOCUMENTS

WO WO-2023086021 A2 * 5/2023 ........... G06Q 10/101

* cited by examiner

*Primary Examiner* — Phyllis A Book
(74) *Attorney, Agent, or Firm* — Kilpatrick Townsend & Stockton LLP

(57) ABSTRACT

Example methods and systems for creating breakout chat channels are provided. A chat and video conference provider receives from a client device associated with a first member of a plurality of members of a chat channel a request to create a subchannel related to a topic. The chat and video conference provider enables the client device to transmit an invitation message for joining the subchannel to a subset of the plurality of members. The chat and video conference provider establishes the subchannel based on acceptance messages from one or more members of the subset of the plurality of members. The chat and video conference provider generates a chat summary of prior chat messages related to the topic of the subchannel from the chat channel using a generative artificial intelligence (AI) model. The chat and video conference provider provides the chat summary in the subchannel.

20 Claims, 8 Drawing Sheets

BREAKOUT CHAT CHANNELS

FIELD

The present application generally relates to online chat channels and more specifically relates to breakout chat channels.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
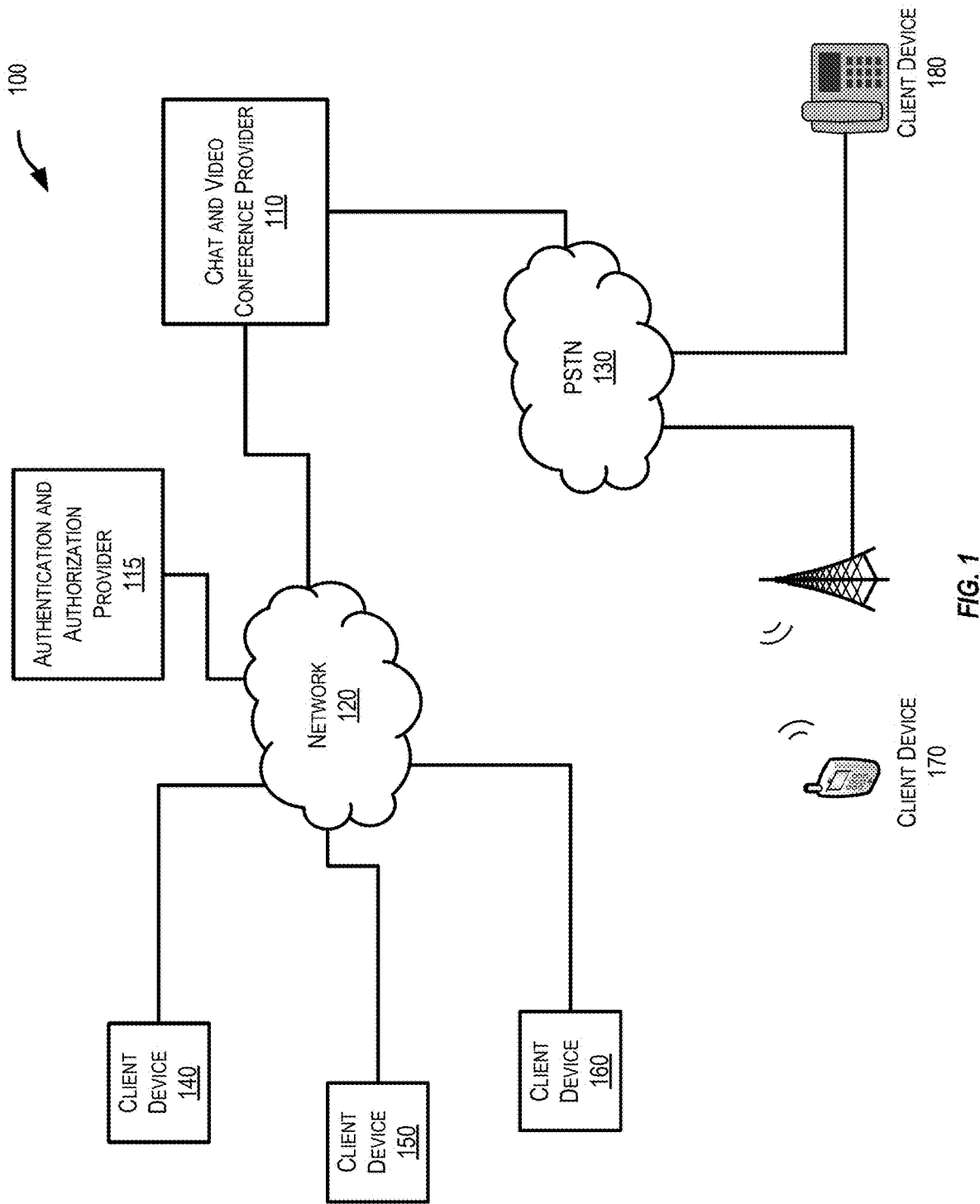
FIG. 1 shows an example system that provides videoconferencing and chat functionality to various client devices.

Examples are described herein in the context of creating breakout chat channels. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Chat channels have become popular means for online users to communicate and interact with each other. An online user may be a member of tens of chat channels. A chat channel may include tens or even hundreds of members. As the number of chat channels and the number of channel members grow, the volume of chat messages also increases significantly in chat channels. Meanwhile, a member user may just intend to send some chat messages to some (not all) members in a chat channel without adding them as contacts.

To reduce chat volume in a chat channel and facilitate temporary private chats, it is desirable for a communication platform to provide breakout chat channels. For example, an example communication platform can enable a user to create a breakout chat channel within an existing chat channel by inviting certain members from the existing chat channel to the breakout chat channel.

The communication platform can establish a chat channel, including members within a user's organization or outside the user's organization. The chat channel can be created upon a user request and the chat channel can be related to a general topic. In some examples, the communication platform creates a chat channel automatically for a video conference, and the participants of the video conferences are the members of the chat channel. If the user wants to just send a chat message to some but not all of the members of the chat channel, the user can send a request to create a breakout chat channel related to a specific topic.

The communication platform enables the user to create a breakout chat channel within the existing chat channel (which can be called a main chat channel, or a parent or master chat channel) and invite certain members in the existing chat channel to the breakout chat channel. Members who receive the invitation message can accept or decline the invitation to join the breakout chat channel. The breakout chat channel is composed of members who have accepted the invitation.

The user who created the breakout chat channel related to a specific topic can request the communication platform to generate a summary of prior chat messages from the existing chat channel that are related to the specific topic of the breakout chat channel. The summary can be shared with the members of the breakout chat channel in the breakout chat channel. In some examples, the creator of the breakout chat channel shares a description about the specific topic for the breakout chat channel. In some examples, a disclaimer message is also provided to the members of the breakout chat channel, including a request for consent to share the chat conversation to the parent chat channel.

In some examples, the breakout chat channel is a temporary chat group or a temporary chat session. The communication platform provides the breakout chat channel in a separate chat window. The separate chat window can be a temporary popup window being displayed in a graphical user interface (GUI) of a communication application associated with a member of the breakout chat channel. Members of the breakout chat channel can chat via the temporary popup window. The temporary popup window provides multiple interactive functionalities, such as phone call, video meeting, screen sharing, or any suitable functionalities that are available to users in a regular chat channel. A member of the breakout chat channel can leave the breakout chat channel by closing the chat window of the breakout chat channel. When every member of the breakout chat channel closes the temporary popup window, the breakout chat channel is dissolved. In some examples, the breakout chat channel can be saved as a new chat channel separate from the existing chat channel. Alternatively, or additionally, the breakout chat channel can be a persistent subchannel of the existing chat channel.

The communication platform or a module of the communication platform can generate a breakout summary of the chat messages in the breakout chat channel and provide the breakout summary to members of the breakout chat channel. In some examples, the communication platform also provides the breakout summary to the owner, administrator, or the rest of the members of the existing chat channel. In some examples, a user is invited by the creator of the breakout chat channel to join the breakout chat channel but did not join the breakout chat channel before the breakout chat channel is dissolved. The creator of the breakout chat channel may share the breakout summary with such a user.

Thus, the communication platform enables a user to create a breakout chat channel to have a temporary chat session with certain invited members. The chat messages in the breakout chat channel may not appear in the parent chat channel, so that the volume of chat messages for other members in the parent chat channel is not increased. Meanwhile, the creator of the breakout chat channel does not need to add certain users as contacts before sending messages to corresponding users. Since certain user information may be only available to contacts, temporarily chatting without adding a user as a contact protects privacy of the creator and other members of the breakout chat channel.

This illustrative example is given to introduce the reader to the general subject matter discussed herein and the disclosure is not limited to this example. The following sections describe various additional non-limiting examples and examples of breakout chat channels.

Referring now to FIG. 1, FIG. 1 shows an example system 100 that provides videoconferencing and chat functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
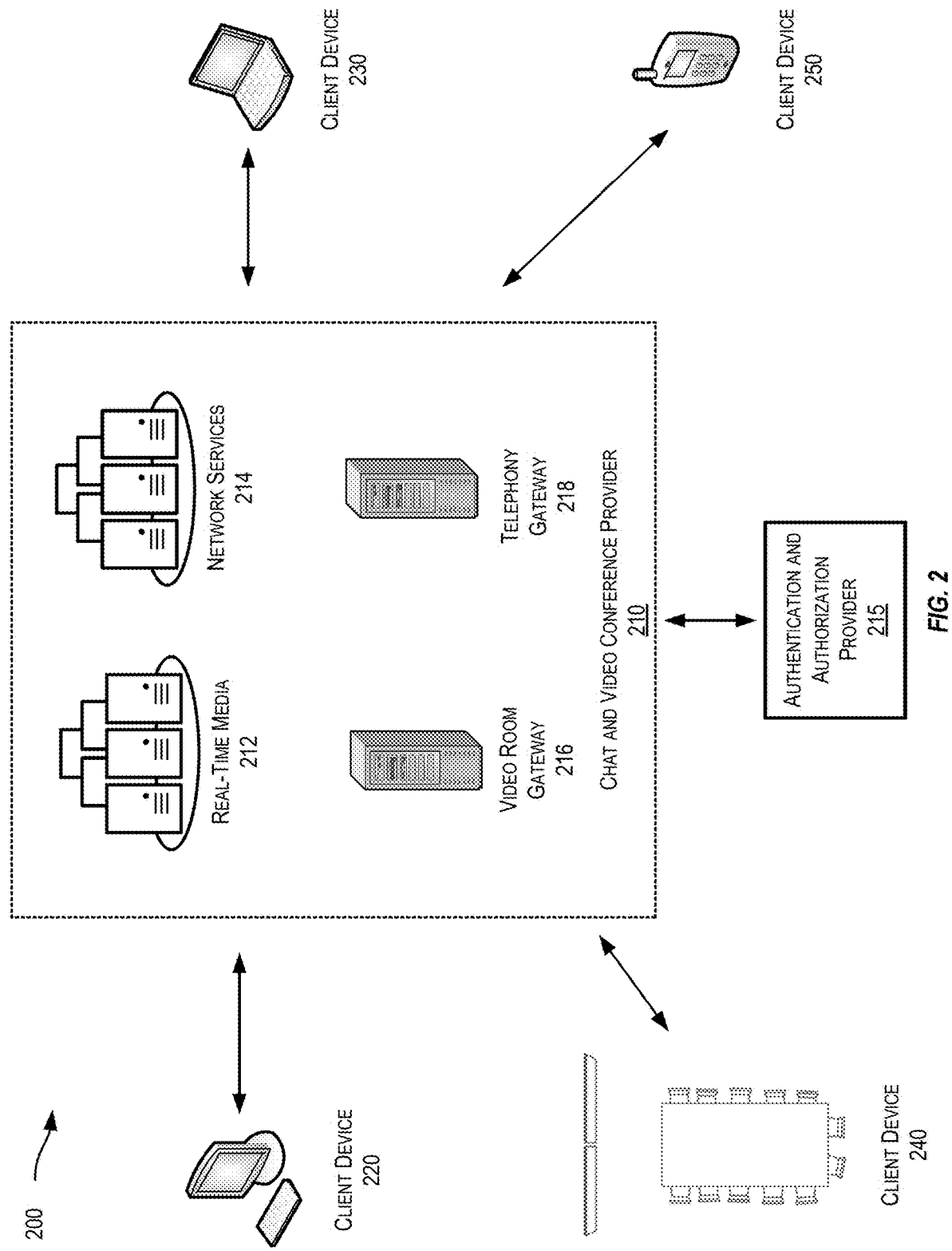
FIG. 2 shows an example system in which a chat and video conference provider provides videoconferencing and chat functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing and chat functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
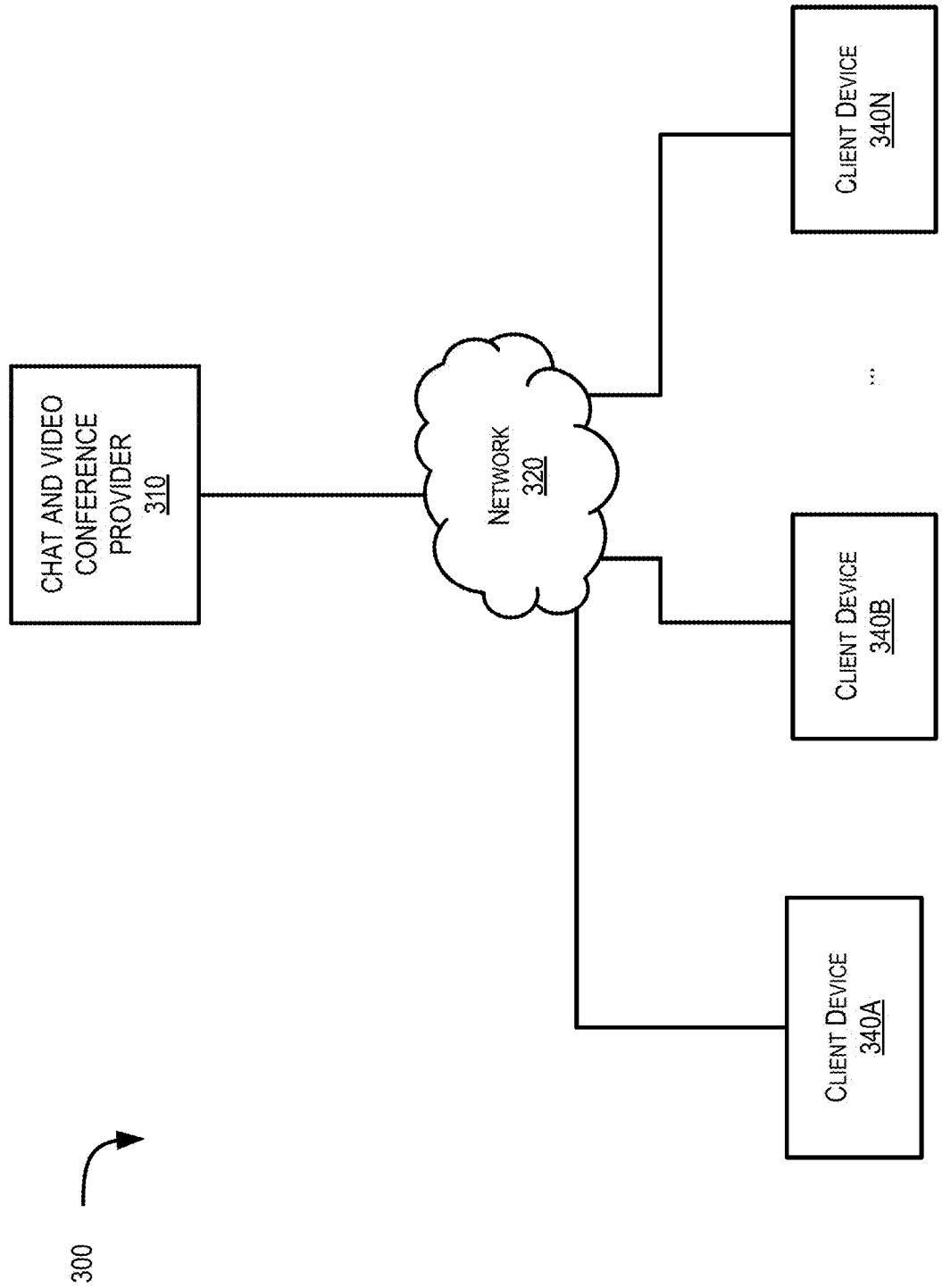
FIG. 3 shows an example system that creates breakout chat channels within a master chat channel.

Referring now to FIG. 3, FIG. 3 shows an example system 300 that creates breakout chat channels within a master chat channel. In this example system 300, a chat and video conference provider 310 and a number of client device 340A-340N (which may be referred to herein individually as a client device 340 or collectively as the client devices 340) are connected via a network 320. The chat and video conference provider 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the chat and video conference provider 310 using the internet or other suitable computer network. The client devices 340 have chat and video conference software installed to enable them to connect to the chat and video conference provider 310. During a chat session, a user associated a client device (e.g., client device 340A) can interact with other users associated with other client devices (e.g., client device 340B-340N) via the chat and video conference provider 310 by sending and receiving chat messages, and reacting to received chat messages.

Figure 4:
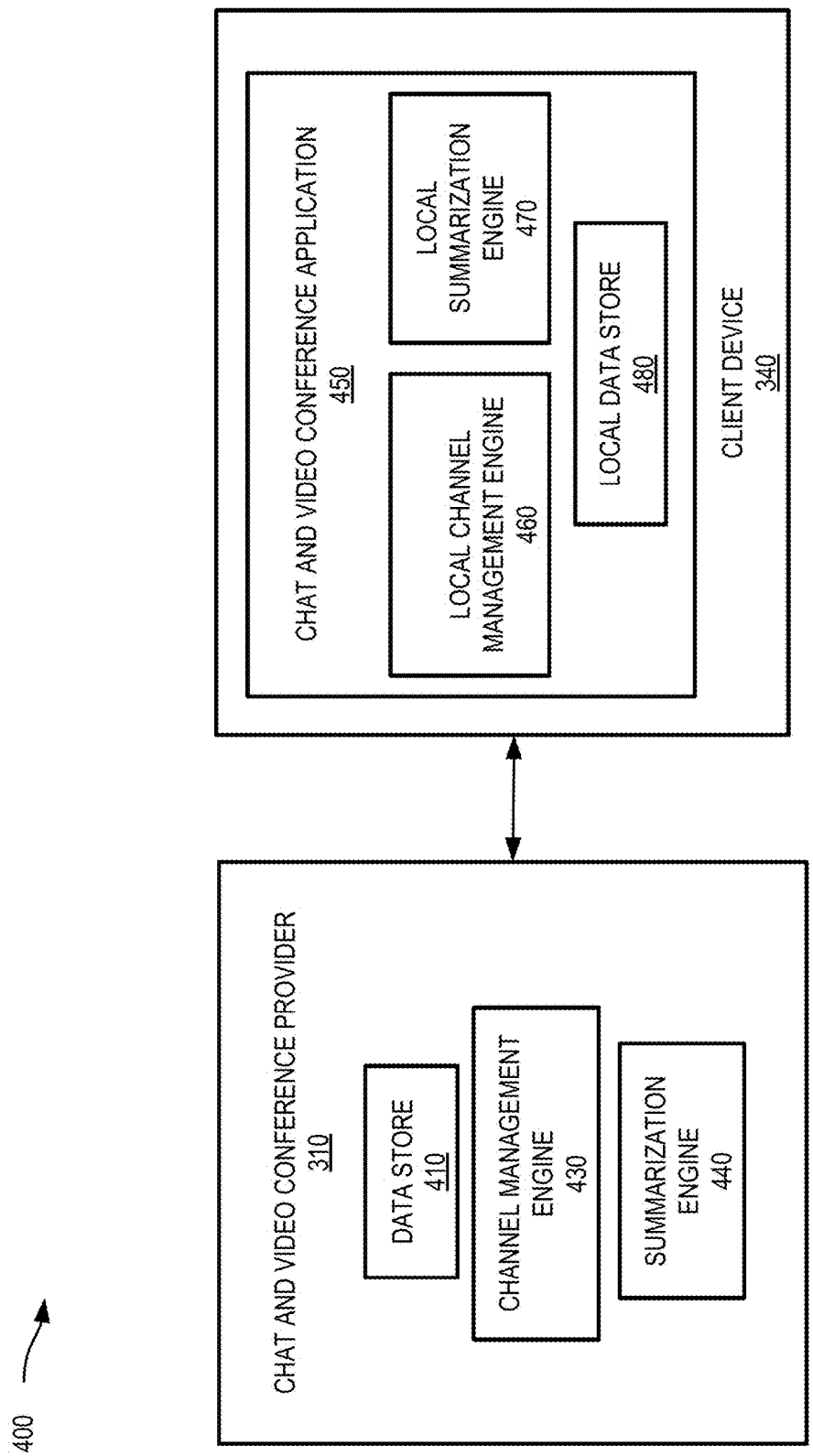
FIG. 4 shows an example system that is configured to create breakout channels within a master chat channel.

Now referring to FIG. 4, FIG. 4 shows an example system 400 that is configured to create breakout chat channels. The chat and video conference provider 310 is in network communication with a client device 340. The client device 340 is installed with a chat and video conference application 450 provided by the chat and video conference provider 310.

The chat and video conference provider 310 includes a data store 410. The data store 410 stores historical chat data and chat channel data from different client devices 340. The historical chat data can include chat message content, sender identification, send time, receiver identification (e.g., chat channel identification) Chat channel data can include channel identification, channel creation time, channel creator data, channel description, channel member data, and channel settings. The data store 410 can also store user metadata. The user metadata includes user profile data, for example, title, team, location, joined chat channels, contact information, connections, status, and any information that can be included in a user profile on the chat and video conference provider 310. The user metadata also includes user activity data, for example, user actions associated with historical chat channel data and user interactions with other users on the chat and video conference provider 310. The user actions associated with historical chat channel data includes if the user read the chat messages or did not read the chat message, or if the user responded or did not respond to the chat message. The user interactions with other users via the chat and video conference provider 310 can include how often a user interacts with different channels and contacts.

The chat and video conference provider 310 includes a channel management engine 430 configured to create chat channels (or chat groups) and subchannels (or subgroups). The channel management engine 430 receives a user request to create a chat channel related to a general topic. The creator user can invite users from the same organization or enterprise as the creator user. In some examples, external users can also join the chat channel either upon request or by invitation. The creator user can assign one or more other users as administrator of the chat channel. In some examples, the channel management engine 430 creates a chat channel automatically for a video conference, and the participants of the video conferences are the members of the chat channel. The host or co-host of the video conference can be the administrator of the chat channel.

The channel management engine 430 can create subchannels within a main chat channel (which can also be called master or parent chat channel) to organize content or users within the main chat channel based on a user request. The user request can be from a creator user or an administrator user. The subchannels can be permanent. Alternatively, subchannels can be temporary. For example, a user wants to just send a chat message to some not all of the members of the main chat channel, the user can send a request to create a breakout channel related to a specific topic. The user does not have to be a creator or administrator of the main chat channel, but can be any member of the main chat channel. In some examples, the user needs permission to create a breakout chat channel from the creator user or the administrator of the parent chat channel.

The channel management engine 430 enables a user to initiate a breakout chat channel within an existing chat channel (the main chat channel) and invite certain members in the existing chat channel to the breakout chat channel. The breakout chat channel can be for a specific topic for a period of time. Members of the main chat channel who receive the invitation message can accept or decline the invitation to join the breakout chat channel. The breakout chat channel includes the breakout creator and users who have accepted the invitation. In some examples, a user can create a breakout chat group during a video conference by inviting a subset of participants of the video conference to a breakout chat group.

In some examples, the creator of the breakout chat channel provides a description about the specific topic for the breakout chat channel. In some examples, a disclaimer message is also provided to the members of the breakout chat channel, for example the chat conversation in the breakout chat channel is visible to or is shared with the administrator of the main chat channel. In some examples, the creator of the breakout chat channel also sends a request to members of the breakout chat channel for consenting to share the chat conversation in the parent chat channel. The consent request can also be included in the invitation message.

The breakout chat channel provides multiple interactive functionalities besides chatting, for example phone call, video meeting, screen sharing, or any suitable functionalities that are available to users in a regular chat channel. A breakout chat channel can be temporary in a popup chat window. As a member closes the popup chat window, the member leaves the breakout chat channel. When every member of the breakout chat channel closes the temporary popup window, the breakout chat channel is dissolved. In some examples, the channel management engine 430 provides an option for the creator to save the breakout chat channel as a persistent subchannel to the parent chat channel or a new channel independent from the parent chat channel. That is, when a user closes the popup chat window, the user does not automatically leave the breakout chat channel. Similarly, the channel management engine 430 can also provide an option for the creator to dissolve the persistent breakout chat channel.

The chat and video conference provider 310 includes a summarization engine 440. The creator of the breakout chat channel can request a summary of chat messages related to a specific topic in the parent chat channel. The summarization engine 440 can search chat history of the parent chat channel for chat messages related to the specific topic. The creator of the breakout chat channel can specify a time period of chat messages, for example the past 7 days. The summarization engine 440 can generate a chat summary related to the specific topic. In some examples, the summarization engine 440 implements a generative AI model to generate a chat summary. The creator of the breakout chat channel can share the chat summary with members of the breakout chat channel in the breakout chat channel, for example as a chat message in the breakout chat channel.

The creator of the breakout chat channel can also request a breakout summary of chat messages in the breakout chat channel. In some examples, the request for chat summary is preset, and a chat summary is automatically generated and provided to members of the breakout chat channel as an automatically generated chat message in the breakout chat channel or via email, system notification message, or any other suitable means. In some examples, the summarization engine 440 also provides the breakout summary to the owner, administrator, or the rest of the members of the parent chat channel. In some examples, a user is invited by the creator of the breakout chat channel to join the breakout chat channel but did not join the breakout chat channel before the breakout chat channel is dissolved. The creator of the breakout chat channel may also share the breakout summary with such a user after the breakout chat session.

The summarization engine 420 can implement a pre-trained machine learning (ML) model to generate a summary based on chat messages. In some examples, the ML model is pre-trained to extract transcript sentences including the extracted key phrases to generate a text summary. Examples of extractive summarization models include TextRank, LexRank, and Luhn. In some examples, the chat and video conference provider 310 implements a pre-trained ML model for abstracting and synthesizing the chat messages to generate new sentences for the summary. Examples of abstractive summarization models include Bidirectional Auto-Regressive Transformer (BART), Text-to-Text Transfer Transformer (T5), generative pre-trained transformer (GPT), or other suitable generative AI models and their variations.

The chat and video conference application 450 installed on a client device 340 provides a GUI for a user to interact with the chat and video conference provider 310 for creating or joining a chat channel or breakout chat channel. The chat and video conference application 450 also provides a GUI for the user associated with the client device 340 to interact with users in joined chat channels or breakout chat channels. In some examples, the chat and video conference application 450 includes a local channel management engine 460, a local summarization engine 470, and a local data store 480. The local data store 480 stores chat data and user metadata for the user associated with the client device 340.

The local channel management engine 460 can create a breakout chat channel for the user associated with the client device 340, similar to the channel management engine 430 on the chat and video conference provider 310. The local summarization engine 470 can generate a summary for chat messages, similar to the summarization engine 440 on the chat and video conference provider 310.

In some examples of the present disclosure, implementations may include or otherwise use one or more artificial intelligence or machine learning (collectively, AI/ML) systems having one or more models trained for one or more purposes. Use of such AI/ML systems, such as for certain features or functions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features.

To enhance privacy and safety, as well as provide other benefits, the AI/ML processing system may be prevented from using personal information (e.g., customer audio, video, chat, screen-sharing, attachments, or other communications-like customer content (such as poll results, whiteboards, or reactions)) to train any AI/ML models and instead only use the personal information for inferencing of the AI/ML processing system. Instead of using personal information to train AI/ML models, AI/ML model training may be performed using one or more commercially licensed data sets that do not contain the personal information of the user or organization.

Figure 5:
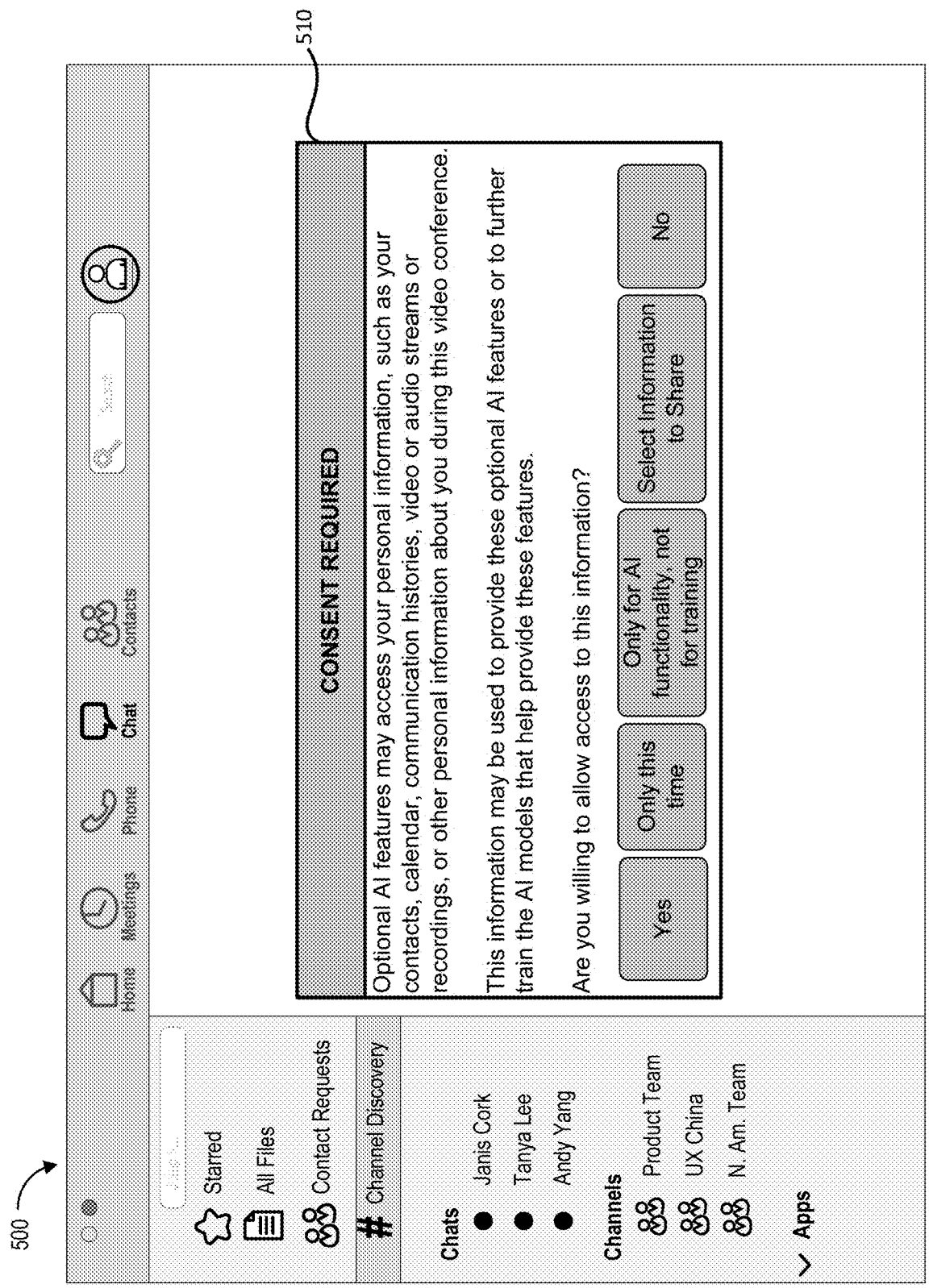
FIG. 5 shows an example GUI displaying a consent authorization request for accessing personal data.

Referring now to FIG. 5, FIG. 5 shows an example GUI 500 displaying a consent authorization request for accessing personal data. In some examples according to the present disclosure, a user may select an option to use one or more optional AI features available from a chat and video conference provider 310, such as the chat and virtual conference provider 110 or the chat and video conference provider 210. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Applicant's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 5, a user has landed on a channel discovery page that may use an available optional AI feature. In response, the GUI has displayed a consent authorization window 510 for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 6:
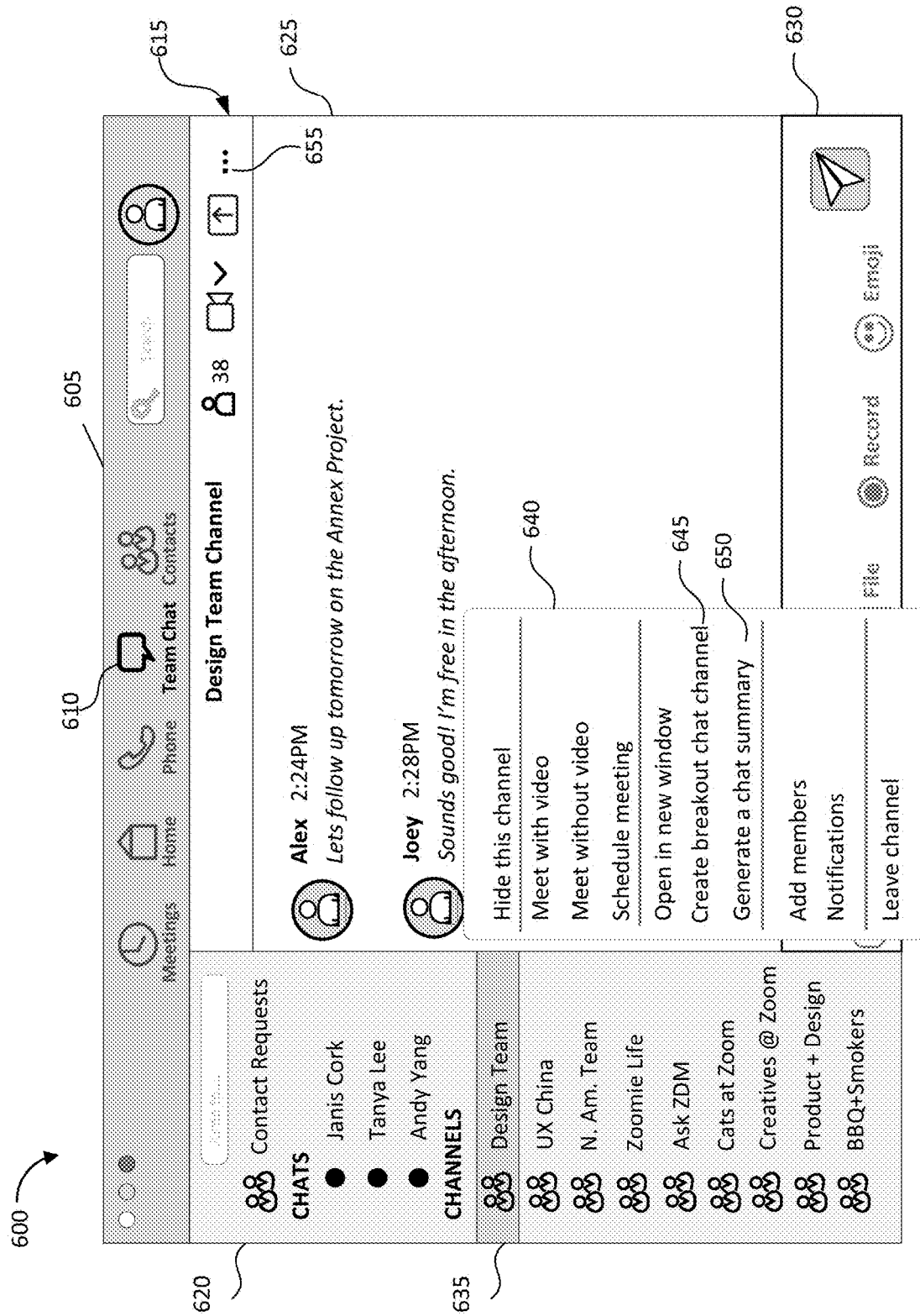
FIG. 6 shows an example master chat panel.

Now referring to FIG. 6, FIG. 6 shows an example master chat panel 600. The master chat panel 600 may be displayed on a client device 340 in response to information sent by a chat and video conference provider, such as the chat and video conference provider 310 in FIG. 4. The master chat panel 600 may be generated by a chat application run by one or more processors stored on the client device 340. In some examples, the application is a standalone chat client. In some examples, the application is integrated into a video conferencing application, such as a chat and video conference application 450 in FIG. 4. The client device 340 may be a personal computer such as a desktop or laptop, a mobile device, or other computing device having at least a processor, non-transitory memory, a user input system, and communication interface, providing network connectivity.

The master chat panel 600 may include a general dashboard 605, a chat control dashboard 615, a sidebar 620, a chat window 625, and a reply panel 630. The general dashboard 605 may include one or more buttons or links that switch functionalities and/or views from the master chat panel 600. In this example, FIG. 6 shows a chat view, perhaps in response to a user command selecting a chat button 610 in the general dashboard 605. In this view, the chat window 625, the reply panel 630, and other components illustrated in FIG. 6 may be displayed on the client device 340. The sidebar 620 may be displayed alongside the chat window 625. Other configurations are also possible. Various buttons on the general dashboard 605 may correspond to various displays of windows being displayed on the client device 340. Any number of components shown in FIG. 6 may be displayed on the client device 340 with any of the various windows. Similarly, any of the components may cease to be displayed in accordance with any of the windows.

The sidebar 620 may include one or more chat headings. A chat heading may include one or more chat channels or chat contacts. In FIG. 6, the Design Team channel is selected to be displayed in the chat window 625. The master chat panel 600 may include a menu 640. The menu 640 may include one or more buttons, which add functionality to the messages in the chat channels and/or the chat channels themselves. The menu 640 may be displayed in response to a user request on the client device 340. In the illustrated example, the user may have requested the menu 640 associated with a design team chat channel 635. The user may have requested the menu 640 from the client device 340 using a cursor. In some examples, mousing over a chat channel may cause the menu 640 to be displayed. In other examples, the menu 640 may be displayed in response to another user input (e.g., a right-click on the mouse while hovering over the design team chat channel 635). In other examples, the menu 640 may be displayed by a user input occurring in another space rather than the design team chat channel 635. For example, the menu 640 may be brought up by an input in a blank space of a chat window 625 or to the right of the chat window 625. One of ordinary skill in the art would recognize many different possibilities. The menu 640 may display the same functions or different functions depending on where it is opened. For example, there may be a button on the chat control dashboard 615 that causes the client device 340 to open the menu 640. For example, left-clicking the ellipsis button 655 on the chat control dashboard 615 can open the menu 640.

The menu 640 may include options associated with a chat channel. Those options may include starting a video conference (or "meeting"), scheduling a meeting, adding or removing members from the chat channel, changing setting associated with notifications sent to the client device, no longer displaying the chat channel in sidebar 620, recording a video message, opening the chat channel in a new window, and other such options. For example, the menu 640 can also include an option 645 for creating a breakout chat channel and an option 650 for generating a chat summary.

If a user selects option 645 for creating a breakout chat channel, a popup window (not shown) can be displayed for the user to provide more information about the breakout chat channel. For example, the user can define a specific topic for the breakout chat channel and invite other users to join the breakout chat channel. When the user confirms the specificity of breakout chat channel, a breakout chat channel can be created. The breakout chat channel can be displayed in a popup chat window over the chat window 625 for the design team chat channel 635. Alternatively, or additionally, the breakout chat channel can be added to the list of channels displayed in the sidebar 620 or as a subchannel under the design team chat channel 635.

If a user selects option 650 for generating a chat summary, a popup window (not shown) can be displayed for the user to specify the chat summary, for example a summary for unread messages, a summary of chat messages during a period of time, a summary of chat messages from a specific person, or a summary of chat messages related to a specific topic. For example, following the creation of a breakout chat channel, the user can request a summary of chat messages related to the specific topic from the parent chat channel (e.g., the design team chat channel 635) and send the summary to the breakout chat channel.

Figure 7:
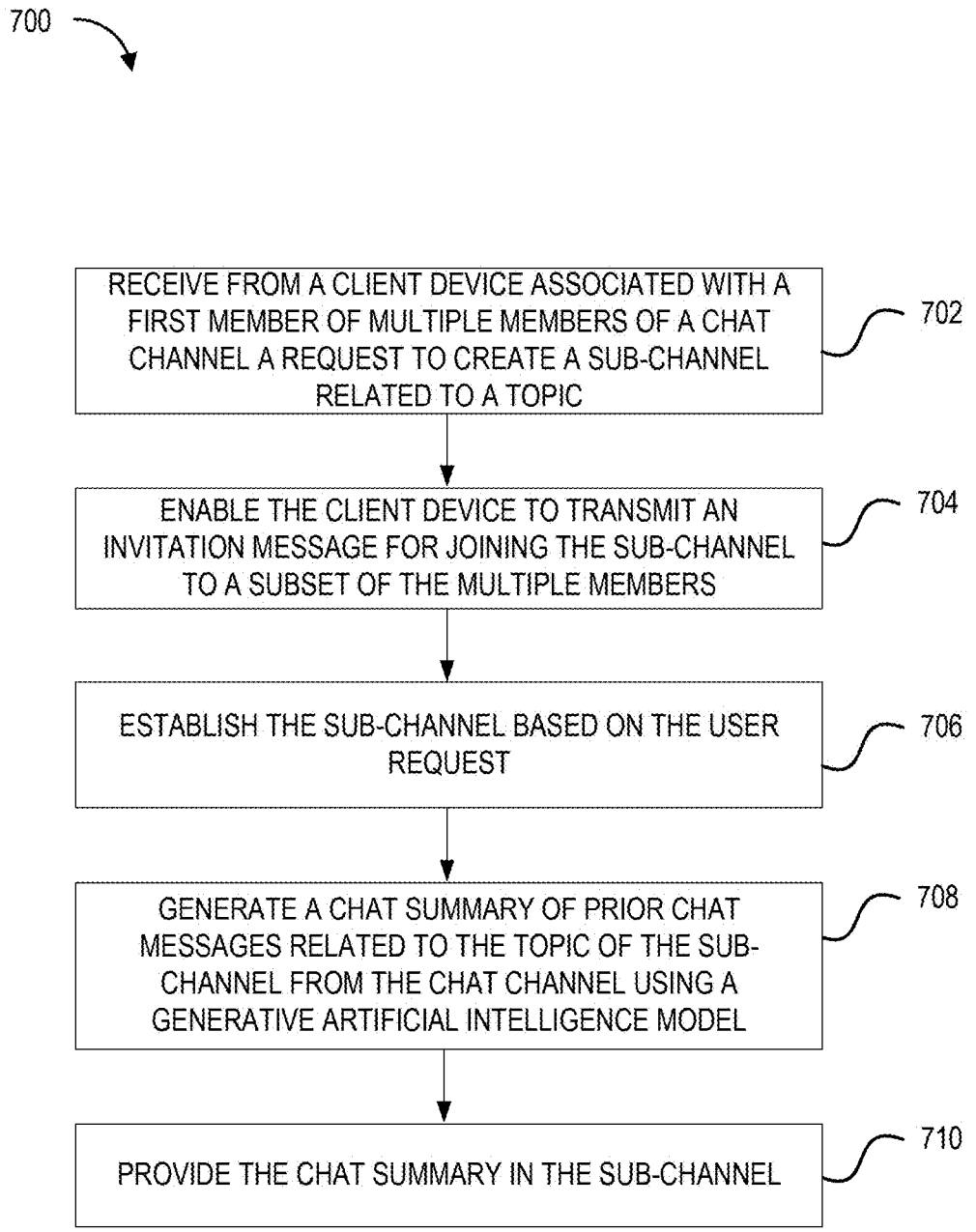
FIG. 7 shows an example method for creating a breakout chat channel.

Now referring to FIG. 7, FIG. 7 shows an example method 700 for creating breakout chat channels. The example method 700 will be discussed with respect to the system 400 shown in FIG. 4; however, any suitable system for creating breakout chat channels may be used.

At block 702, a chat and video conference provider 310 receives from a client device 340 associated with a first member of multiple members of a chat channel a request to create a subchannel related to a topic. The channel management engine 430 on the chat and video conference provider 310 can establish a chat channel including multiple members, generally as described in FIG. 4. In some examples, the channel management engine 430 can create a channel related to a general topic based on a user request. In some examples, the channel management engine 430 creates a chat channel automatically for a video conference. Participants of the video conferences are automatically added as the members of the chat channel.

A first member of the chat channel can request to create a subchannel or subgroup within the chat channel, which can be considered as a parent or master chat channel. Any member can request to create a subchannel or subgroup, regardless of the member being the channel creator, a channel administrator, or a regular member in the chat channel. The subchannel or subgroup can be a temporary breakout channel, group, or session. Option 645 in FIG. 6 shows an example way to create a breakout chat channel. The subchannel can be related to a specific topic. The creator or administrator of the parent chat channel may be notified of the request to create a subchannel.

At block 704, the chat and video conference provider 310 enables the client device 340 to transmit an invitation message for joining the subchannel to a subset of the multiple members. The first member can invite certain members from the members of the master chat channel to join the subchannel. For example, the first member can select certain members in a popup window for creating a subchannel. The selection triggers the chat and video conference provider 310 to transmit invitation messages to the selected members.

At block 706, the chat and video conference provider 310 establishes the subchannel based on the user request. The invited members at block 704 can accept to join the subchannel upon receiving the invitation message. The subchannel is thus established between the first member and members who accepted the invitation. Alternatively, the subchannel can be established before invitation messages are sent to or accepted by certain members in the parent chat channel. The subchannel can be a temporary breakout channel displayed in a popup window. In some examples, the subchannel is also listed under the main master chat channel or as a separate chat channel independent from the main master chat channel. The popup window provides interactive functionalities that are available to regular chat channels besides chatting (either text-based or audio-based), for example phone call, video meeting, screen sharing. In some examples, if a subchannel member closes the popup window, the subchannel member leaves the subchannel. In some examples, the subchannel member can still go back to the subchannel after closing the popup window (e.g., if the subchannel is listed under the master chat channel). The subchannel can be dissolved if every subchannel member closes the popup window for the subchannel. Alternatively, or additionally, the first member (subchannel creator) can specify to dissolve the subchannel after a period of time or save it as a persistent channel, either as a subchannel to the master chat channel or as a separate channel independent of the master channel.

At block 708, the chat and video conference provider 310 generates a chat summary of prior chat messages related to the topic of the subchannel from the chat channel using a generative AI model. The summarization engine 440 of the chat and video conference provider 310 can generate a chat summary, generally as described in FIG. 4. For example, the first member (subchannel creator) can request a chat summary of prior chat messages from the master chat channel related to the topic of the subchannel. Alternatively, or additionally, the summarization engine 440 can automatically generate such a summary and sends to the subchannel. In some examples, the summarization engine 440 can also generate a subchannel summary based on chat messages in the subchannel. The subchannel summary can be generated based on user request or automatically. In some examples, a subchannel summary can be automatically generated based on the historical chat messages in a subchannel after the subchannel is dissolved. In some examples, a subchannel summary can be automatically generated periodically (e.g., daily or every 2 hours) or after a threshold number (e.g., 50, 100, or 250, etc.) of chat messages have been exchanged while the subchannel still exists (or is not dissolved). A user can pre-set the frequency of subchannel summary generation via a GUI. The user can also select to enable or disable the summary generation function via the GUI.

At block 710, the chat and video conference provider 310 provides the chat summary in the subchannel. The chat summary of prior chat messages related to the topic of the subchannel can be sent to the subchannel as a refresher for the subchannel members, before discussion in the subchannel starts. In some examples, a subchannel summary can also be generated as described above. The subchannel summary can be sent to subchannel members, invitees of the subchannel who did not join the subchannel, or the creator or administrator of the master chat channel after the subchannel is dissolved or at a predetermined frequency while the subchannel still exists (or is not dissolved).

The example process 700 illustrates a method for creating a subchannel within a master chat channel. However, not every step in the example process 700 may be needed, or some other steps may be added. Also, the steps in process 700 may not follow the order illustrated in FIG. 7 or described above. For example, block 706 can be performed before block 704. The example process 700 is performed by a chat and video conference provider 310. Alternatively, the example process 700 can be performed by a chat and video conference application 450 installed on a client device 340.

Figure 8:
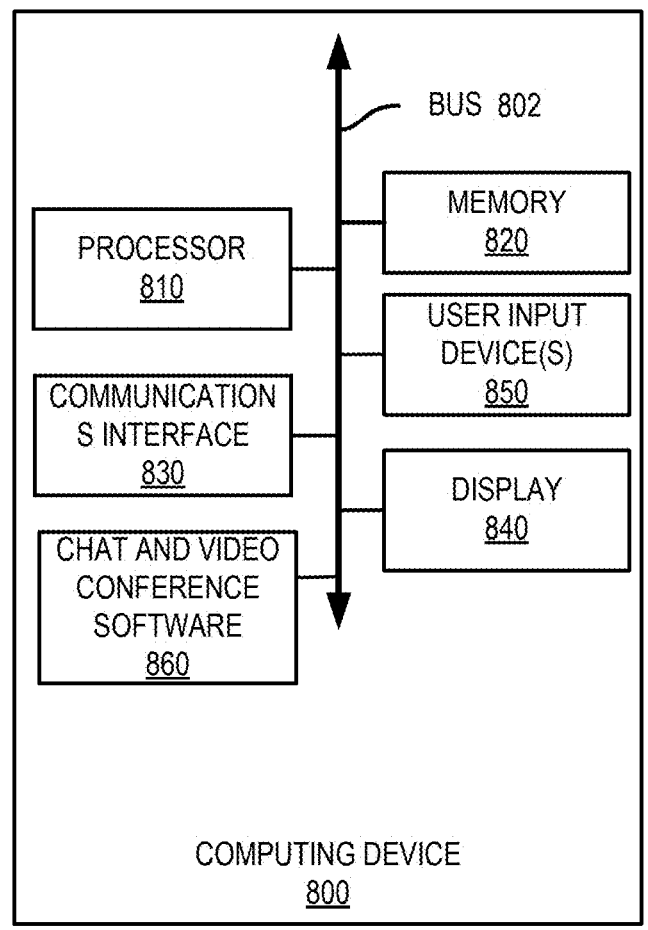
FIG. 8 shows an example computing device suitable for use in example systems or methods for creating breakout chat channels.

Now referring to FIG. 8, FIG. 8 shows an example computing device 800 suitable for use in example systems or methods for creating breakout chat channels. The example computing device 800 includes a processor 810 which is in communication with the memory 820 and other components of the computing device 800 using one or more communications buses 802. The processor 810 is configured to execute processor-executable instructions stored in the memory 820 to perform one or more methods for recommending or summarizing unread messages, such as part or all of the example method 700, described above with respect to FIG. 7. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user. The computing device 800 may also include a chat and video conference software 860. The chat and video conference software 860 may include a chat client, a video conference platform, and any other software to enable communication from a first user to a second user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, from a client device associated with a first member of a plurality of members of a chat channel, a user request to create a subchannel related to a topic;
enabling the client device to transmit an invitation message for joining the subchannel to a subset of the plurality of members;
establishing the subchannel based on the user request, wherein subchannel members of the subchannel comprise at least the first member;
generating a chat summary of prior chat messages related to the topic of the subchannel from the chat channel using a generative artificial intelligence (AI) model; and
providing the chat summary in the subchannel.

2. The method of claim 1, further comprising:
receiving one or more acceptance messages from one or more members of the subset of the plurality of members; and
adding the one or more members of the subset of the plurality of members to the subchannel, wherein the subchannel members further comprises the one or more members of the subset of the plurality of members.

3. The method of claim 1, wherein the chat channel is established for a video meeting,
and wherein the plurality of members are participants of the video meeting.

4. The method of claim 1, further comprising:
dissolving the subchannel in response to a request message from the first member.

5. The method of claim 1, wherein the subchannel is a breakout channel, wherein the method further comprises:
providing a popup window for the breakout channel; and
causing a breakout channel member to leave the breakout channel in response to the breakout channel member closing the popup window.

6. The method of claim 5, wherein the popup window provides a plurality of interactive elements configured for phone call, video meeting, or screen sharing.

7. The method of claim 1, further comprising:
generating a subchannel summary of chat messages in the subchannel using the generative AI model; and
providing the subchannel summary to the subchannel members.

8. The method of claim 7, further comprising enabling the first member to provide the subchannel summary to a user that received the invitation message but did not accept to join the subchannel.

9. The method of claim 7, further comprising providing the subchannel summary to an administrator of the chat channel.

10. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive, from a client device associated with a first member of a plurality of members of a chat channel, a user request to create a subchannel related to a topic;
enable the client device to transmit an invitation message for joining the subchannel to a subset of the plurality of members;

establish the subchannel based on the user request, wherein subchannel members of the subchannel comprises at least the first member;

generate a chat summary of prior chat messages related to the topic of the subchannel from the chat channel using a generative artificial intelligence (AI) model; and provide the chat summary in the subchannel.

11. The system of claim 10, wherein the chat channel is established for a video meeting, and wherein the plurality of members are participants of the video meeting.

12. The system of claim 10, wherein the subchannel is a breakout channel, wherein the one or more processors are configured to execute further processor-executable instructions stored in the non-transitory computer-readable medium to:

provide a popup window for the breakout channel;

cause a breakout channel member to leave the breakout channel in response to the breakout channel member closing the popup window; and dissolving the breakout channel in response to all breakout channel members closing the popup window.

13. The system of claim 10, wherein the one or more processors are configured to execute further processor-executable instructions stored in the non-transitory computer-readable medium to:

generate a subchannel summary of chat messages in the subchannel using the generative AI model; and provide the subchannel summary to the subchannel members.

14. The system of claim 13, wherein the one or more processors are configured to execute further processor-executable instructions stored in the non-transitory computer-readable medium to:

enable the first member to provide the subchannel summary to a user that received the invitation message but did not accept to join the subchannel.

15. The system of claim 13, wherein the one or more processors are configured to execute further processor-executable instructions stored in the non-transitory computer-readable medium to:

provide the subchannel summary to an administrator of the chat channel.

16. A non-transitory computer-readable medium comprising processor-executable instructions configured to cause one or more processors to:

receive, from a client device associated with a first member of a plurality of members of a chat channel, a user request to create a subchannel related to a topic;

enable the client device to transmit an invitation message for joining the subchannel to a subset of the plurality of members;

establish the subchannel based on the user request, wherein subchannel members comprises at least the first member;

generate a chat summary of prior chat messages related to the topic of the subchannel from the chat channel using a generative artificial intelligence (AI) model; and provide the chat summary in the subchannel.

17. The non-transitory computer-readable medium of claim 16, wherein the chat channel is established for a video meeting, and wherein the plurality of members are participants of the video meeting.

18. The non-transitory computer-readable medium of claim 16, wherein the subchannel is a breakout channel, wherein the non-transitory computer-readable medium further comprises processor-executable instructions configured to cause one or more processors to:

provide a popup window for the breakout channel;

cause a breakout channel member to leave the breakout channel in response to the breakout channel member closing the popup window; and dissolving the breakout channel in response to all breakout channel members closing the popup window.

19. The non-transitory computer-readable medium of claim 16, further comprising processor-executable instructions configured to cause one or more processors to:

generate a subchannel summary of chat messages in the subchannel using the generative AI model; and provide the subchannel summary to the subchannel members.

20. The non-transitory computer-readable medium of claim 19, further comprising processor-executable instructions configured to cause one or more processors to:

enable the first member to provide the subchannel summary to a user that received the invitation message but did not accept to join the subchannel.

* * * * *